United States Patent
Nakazawa et al.

(10) Patent No.: US 6,228,501 B1
(45) Date of Patent: May 8, 2001

(54) POROUS BODY OF POLYSACCHARIDE OR POLYSACCHARIDE-CLAY COMPOSITE, AND PROCESS FOR ITS PRODUCTION

(75) Inventors: Hiromoto Nakazawa, Tsuchiura; Shun-ichi Ohta, Kuroiso, both of (JP)

(73) Assignee: National Institute for Research in Inorganic Materials, Tsukuba (JP)

(*) Notice: Subject to any disclaimer, the term of this patent is extended or adjusted under 35 U.S.C. 154(b) by 0 days.

(21) Appl. No.: 08/384,930

(22) Filed: Feb. 7, 1995

(30) Foreign Application Priority Data

Sep. 26, 1994 (JP) .................................................. 6-256186

(51) Int. Cl.$^7$ ....................................................... B32B 9/04
(52) U.S. Cl. .................... 428/454; 501/141; 428/35.6; 206/814; 106/681
(58) Field of Search .................. 428/454, 35.6; 501/141; 106/210, 214, 681; 206/814

(56) References Cited

U.S. PATENT DOCUMENTS

| | | | |
|---|---|---|---|
| 3,676,330 | 7/1972 | Plank et al. | 502/64 |
| 4,448,914 | 5/1984 | Drinkuth et al. | 524/32 |
| 4,629,713 | 12/1986 | Suzuki et al. | 502/84 |
| 5,035,930 * | 7/1991 | Lacourse | 428/35.6 |
| 5,078,793 | 1/1992 | Caton | 106/417 |
| 5,165,915 | 11/1992 | Tokubo et al. | 424/63 |
| 5,208,267 * | 5/1993 | Neumann | 521/79 |
| 5,266,368 * | 11/1993 | Miller | 428/35.6 |
| 5,288,765 * | 2/1994 | Bastioli | 521/84.1 |

FOREIGN PATENT DOCUMENTS

| | | |
|---|---|---|
| P 38 05 852 A1 | 9/1989 | (DE) . |
| 2 063 911 | 7/1971 | (FR) . |

OTHER PUBLICATIONS

Clay Science 6, pp. 269 to 276 (1987), No month.
Derwent–Abstract 88–312169/44 of JP 63230581, No date.
Derwent–Abstract 85–239485/39 of JP 60155526, No date.
Derwent–Abstract 85–214256/35 of JP 60137813, No date.
German Office Action for German Patent Application No. 195 04 899. 7–44, dated Oct. 15, 1996 with English Translation.
Trans. Mat. Res. Soc. JPN., vol. 18A, pp. 157 to 160 (1994) (No month).
JICST–EPLUS–ABSTR. 940926684, 1994, (No month).

* cited by examiner

*Primary Examiner*—Deborah Jones
(74) *Attorney, Agent, or Firm*—Oblon, Spivak, McClelland, Maier & Neustadt, P.C.

(57) ABSTRACT

A porous body of polysaccharide or polysaccharide-clay composite having fine pores, consisting essentially of a freeze-dried product of (a) an aqueous solution of at least one polysaccharide selected from the group consisting of starch, sodium alginate and carboxymethyl cellulose, or its derivative, or (b) a composite sol comprising such an aqueous solution and a clay sol.

11 Claims, No Drawings

POROUS BODY OF POLYSACCHARIDE OR POLYSACCHARIDE-CLAY COMPOSITE, AND PROCESS FOR ITS PRODUCTION

BACKGROUND OF THE INVENTION

1. Field of the Invention

The present invention relates to a porous body of polysaccharide or polysaccharide-clay composite as a material compatible with the global environment, and a process for its production.

2. Discussion of Background

Heretofore, plastic materials such as foamed styrols (polystyrenes) or styrene papers, have been widely used as shock-absorbing materials, heat insulation materials or sound-absorbing materials, since they are light in weight and inexpensive.

However, such conventional plastic materials are made of petroleum extracted by a man power from a deposit deep in the earth's crust, and they are typical materials which cause pollution to the global environment in such a way that at the time of incineration after their use, they produce a high temperature heat to damage incinerators and generate a large amount of $CO_2$ gas. Further, such plastic materials are likely to cause pollution to rivers or sea shores when left without being incinerated. To avoid such pollution to the global environment, a study is being conducted on readily degradable plastic materials such as biodegradable or photodegradable plastic materials.

However, up to now, there has been no material which is satisfactory for practical use, and it is still desired to develop a material which can be substituted for conventional plastic materials.

SUMMARY OF THE INVENTION

The present invention has been made in view of the above-mentioned circumstances, and it is an object of the present invention to overcome the drawbacks of conventional plastic materials such as foamed styrols or styrene papers and to provide a new material which is made solely of raw materials which are compatible with the global environment, which can easily be recovered and reused, which, when disposed, can readily be assimilated into natural soil and taken into the ecosystem, which is further effective for shock absorption, heat insulation or sound absorption and which can be substituted for plastic materials such as foamed styrols or styrene papers, as well as a process for producing such a new material.

The present invention provides a porous body of polysaccharide or polysaccharide-clay composite having fine pores, consisting essentially of a freeze-dried product of (a) an aqueous solution of at least one polysaccharide selected from the group consisting of starch, sodium alginate and carboxymethyl cellulose, or its derivative, or (b) a composite sol comprising such an aqueous sol and a clay sol.

Further, the present invention provides a process for producing a porous body of polysaccharide or polysaccharide-clay composite having fine pores, which comprises rapidly freezing (a) an aqueous solution of at least one polysaccharide selected from the group consisting of starch, sodium alginate and carboxymethyl cellulose, or its derivative, or (b) a mixed sol comprising such an aqueous solution and a clay sol, and vacuum drying the frozen product without melting ice.

DETAILED DESCRIPTION OF THE PREFERRED EMBODIMENTS

As mentioned above, the present invention provides a porous body of a natural polysaccharide or its derivative, or a porous body of a composite of such a natural polysaccharide or its derivative with clay. Such a porous body is useful as a shock-absorbing material, a heat insulation material or a sound-absorbing material, as a substitute for conventional plastic materials.

This porous body is produced by freezing and vacuum drying as mentioned above. Preferably, the freezing is carried out rapidly at an average freezing rate of at least $1 \times 10^{-2}$ ml/sec. If the freezing rate is too low, it will be difficult to form a porous body with strength sufficient for practical use. Further, with the porous body of the present invention, it is possible to control the compression strength of the material by changing the ratio of the natural polysaccharide or its derivative to the clay.

The natural polysaccharide or its derivative to be used in the present invention is at least one member selected from the group consisting of starch, sodium alginate and carboxymethyl cellulose, and their derivatives including esters, ethers, hydrolyzates and oligomers which can be obtained by conventional modifications or conversions. As the clay, a natural clay such as montmorillonite, saponite, beidellite, kaolinite, allophane, or bentonite, or a synthetic clay prepared by chemically modifying or changing such a natural clay, may be employed. Depending upon the particular purpose, a natural fiber such as paper pulp, hemp or cotton, a coloring matter or a perfume may be added. With respect to mixing of the polysaccharide and the clay, an aqueous solution of the polysaccharide with a solid to liquid ratio of from 1:5 to 1:30 and a sol of the clay with a solid to liquid ratio of about 1:20 are preferably mixed in a weight ratio of from 20:80 to 70:30.

Now, the porous body of a natural polysaccharide or its derivative and the porous body of a composite of a natural polysaccharide or its derivative with clay according to the present invention will be described in further detail with reference to Examples. However, it should be understood that the present invention is by no means restricted to such specific Examples.

EXAMPLE 1

Natural bentonite produced in Aterasawa, Yamagataken, Japan, was subjected to levigation, whereby mineral particles of at most 2 μm were collected to concentrate a montmorillonite component. Then, using an aqueous sodium chloride solution, interlayer cations of montmorillonite were substituted by $Na^+$, followed by washing with water and drying to obtain a starting material. The starting material and water were weighed and mixed to obtain a clay sol with a solid to liquid ratio of 1:9, which was left to stand for one day for aging. On the other hand, as a natural polysaccharide or its derivative, highly gelatinized starch extracted from corn was used, and the starch and water were weighed and mixed in a solid to liquid ratio of 1:19, followed by heating for gelatinization to obtain a starch paste. The starch paste and the clay sol were mixed under heating in a starch paste/clay sol ratio of 50/50. This mixed sol was put into a stainless steel container, and the container was immersed in liquid nitrogen to rapidly freeze the mixed sol at an average freezing rate of at least $5 \times 10^{-2}$ ml/sec, and the frozen product was vacuum-dried to obtain a porous body. The porous body was taken out, and the compression strength was measured, whereby the compression strength was found to be superior to the compression strength of a commercially available foamed styrol. By the shape of the container, it was possible to control the shape of the porous body to be of a block-shape or a rod-shape.

EXAMPLE 2

The same starch paste as used in Example 1 was rapidly frozen at an average freezing rate of at least $6\times10^{-2}$ ml/sec, and the frozen product was vacuum-dried to obtain a porous body. The porous body was taken out from the container, and the compression strength was measured, whereby the compression strength was found to be superior to the compression strength of a commercially available foamed styrol.

EXAMPLE 3

The same starch paste and clay sol as used in Example 1 were mixed in a weight ratio of 50/50 to obtain a mixed sol, and the mixed sol was colored by a red paint and put into a stainless steel container. The container was immersed in liquid nitrogen to rapidly freeze the mixed sol at an average freezing rate of at least $1\times10^{-2}$ ml/sec, and the frozen product was vacuum-dried to obtain a porous body. The porous body was taken out from the container, and the compression strength was measured, whereby the compression strength was found to be substantially equal to the compression strength of the porous body obtained from the mixed sol of 50/50 having no paint incorporated.

COMPARATIVE EXAMPLE 1

The same starch paste and clay sol as used in Example 1 were mixed in a weight ratio of 50/50 to obtain a mixed sol. The mixed sol was put into a stainless steel container, and the container was put in a freezer compartment of a household refrigerator and gradually frozen. The frozen product was dried to obtain a porous body. The porous body was taken out from the container, the obtained porous body of starch-clay composite had lens-shaped pores having a width of 0.1 mm and a length of a few mm, regularly arranged, and had a very low strength.

EXAMPLE 4

Natural bentonite produced in Aterasawa, Yamagataken, Japan, was subjected to levigation, whereby mineral particles of at most 2 μm were collected to concentrate a montmorillonite component. Using an aqueous sodium chloride solution, interlayer cations of montmorillonite were substituted by $Na^+$, followed by washing with water and drying in air to obtain a starting material. The starting material and water were weighed and mixed to obtain a clay sol with a solid to liquid ratio of 1:9, which was left to stand for one day for aging. On the other hand, a commercially available powder of sodium alginate was weighed and mixed to water in a solid to liquid ratio of 1:19 and dissolved.

The aqueous sodium alginate solution and the clay sol were mixed in a ratio of the aqueous sodium alginate solution/the clay sol of 50/50. The mixed sol was put into a stainless steel container, and the container was immersed in liquid nitrogen to rapidly freeze the sol at an average freezing rate of at least $3\times10^{-2}$ ml/sec, and the frozen product was vacuum-dried to obtain a porous body. The porous body was taken out from the container, and the compression strength was measured, whereby the compression strength was found to be superior to the compression strength of a commercially available foamed polystyrene. By the shape of the container, it was possible to control the shape of the porous body to be of a block-shape or a rod-shape.

EXAMPLE 5

The same aqueous sodium alginate solution as used in Example 4 was rapidly frozen at an average freezing rate of at least $1\times10^{-2}$ ml/sec, and the frozen product was vacuum-dried to obtain a porous body. The porous body was taken out from the container, and the compression strength was measured, whereby the compression strength was found to be superior to the compression strength of a commercially available foamed polystyrene.

EXAMPLE 6

The same aqueous sodium alginate solution and clay sol as used in Example 4 were mixed in a weight ratio of 50/50, and the mixed sol was colored by a red paint and put into a stainless steel container. The container was immersed in liquid nitrogen to rapidly freeze the mixed sol at an average freezing rate of at least $1\times10^{-2}$ ml/sec, and the frozen product was vacuum-dried to obtain a porous body. The porous body was taken out from the container, and the compression strength was measured, whereby the compression strength was found to be substantially the same as the mixed sol of 50/50 having no paint incorporated.

COMPARATIVE EXAMPLE 2

The same aqueous sodium alginate solution and clay sol as used in Example 4 were mixed in a weight ratio of 50/50 to obtain a mixed sol, and the mixed sol was put into a stainless steel container. The container was put into a freezer compartment of a household refrigerator and gradually frozen. The frozen product was vacuum-dried to obtain a porous body.

The porous body was taken out from the container, and the obtained porous body of sodium alginate-clay composite had lens-shaped pores having a width of 0.1 mm and a length of a few mm, regularly arranged, and had a very low strength.

EXAMPLE 7

Natural bentonite produced in Aterasawa, Yamagataken, Japan was subjected to levigation, whereby mineral particles of at most 2 μm were collected to concentrate a montmorillonite component. Using an aqueous sodium chloride solution, interlayer cations of montmorillonite were substituted by $Na^+$, followed by washing with water and drying in air to obtain a starting material. The starting material and water were weighed and mixed to obtain a clay sol with a solid to liquid ratio of 1:9, which was left to stand for one day for aging. On the other hand, a commercially available powder of carboxymethyl cellulose was weighed and mixed to water in a solid to liquid ratio of 1:19 and dissolved.

The aqueous carboxymethyl cellulose solution and the clay sol were mixed in a ratio of the aqueous carboxymethyl cellulose solution/the clay sol of 50/50. The mixed sol was put into a stainless steel container, and the container was immersed in liquid nitrogen to rapidly freeze the mixed sol at an average freezing rate of at least $2\times10^{-2}$ ml/sec, and the frozen product was vacuum-dried to obtain a porous body. The porous body was taken out from the container, and the compression strength was measured, whereby the compression strength was found to be superior to the compression strength of a commercially available foamed polystyrene. By the shape of the container, it was possible to control the shape of the porous body to be of a block-shape or a rod-shape.

EXAMPLE 8

The same aqueous carboxymethyl cellulose solution as used in Example 7 was rapidly frozen at an average freezing rate of at least $1\times10^{-2}$ ml/sec, and the frozen product was vacuum-dried to obtain a porous body. The porous body was taken out from the container, and the compression strength was measured, whereby the compression strength was found to be superior to the compression strength of a commercially available foamed polystyrene.

EXAMPLE 9

The same aqueous carboxymethyl cellulose solution and clay sol as used in Example 7 were mixed in a weight ratio of 50/50 to obtain a mixed sol, and the mixed sol was colored by a red paint and put into a stainless steel container. The container was immersed in liquid nitrogen to rapidly freeze the mixed sol at an average freezing rate of at least $1\times10^{-2}$ ml/sec, and the frozen product was vacuum-dried to obtain a porous body. The porous body was taken out from the container, and the compression strength was measured, whereby the compression strength was substantially equal to the compression strength of the porous body made from the mixed sol of 50/50 having no paint incorporated.

COMPARATIVE EXAMPLE 3

The same aqueous carboxymethyl cellulose solution and clay sol as used in Example 7 were mixed in a weight ratio of 50/50 to obtain a mixed sol, and the mixed sol was put into a stainless steel container. The container was put into a freezer compartment of a household refrigerator and gradually frozen. The frozen product was vacuum-dried to obtain a porous body. The porous body was taken out from the container, and the obtained porous body of carboxymethyl cellulose-clay composite had lens-shaped pores having a width of 0.1 mm and a length of a few mm, regularly arranged, and had a very low strength.

Thus, the porous body produced by the process of the present invention is useful as a material which can be substituted for conventional foamed styrols or the like, since it utilizes materials compatible with the global environment, as raw materials, and even when disposed, it will readily be converted to natural soil and will be taken into the ecosystem without polluting the global environment.

As described in the foregoing, according to the present invention, a porous body is produced from raw materials compatible with the global environment, such as a natural polysaccharide or its derivative and clay, and it is thus possible to present a material which can be substituted for conventional plastic materials such as formed styrols.

What is claimed is:

1. A porous body of polysaccharide or polysaccharide-clay composite having fine pores, consisting essentially of a freeze-dried product of (a) an aqueous solution of at least one polysaccharide selected from the group consisting of starch, sodium alginate and carboxymethyl cellulose, or its derivative, or (b) a composite sol comprising such an aqueous solution and a clay sol.

2. The porous body of polysaccharide or polysaccharide-clay composite according to claim 1, wherein at least one member selected from the group consisting of a natural fiber, a coloring matter and a perfume, is incorporated.

3. A process for producing the porous body of claim 1 which comprises rapidly freezing (a) an aqueous solution of at least one polysaccharide selected from the group consisting of starch, sodium alginate and carboxymethyl cellulose, or its derivative, or (b) a mixed sol comprising such an aqueous solution and a clay sol, and vacuum drying the frozen product without melting ice.

4. The process according to claim 3, wherein the average freezing rate is at least $1\times10^{-2}$ ml/sec.

5. The process according to claim 3, wherein at least one member selected from the group consisting of a natural fiber, a coloring matter and a perfume, which is dispersed in water, is mixed prior to the freezing.

6. The process according to claim 4, wherein at least one member selected from the group consisting of a natural fiber, a coloring matter and a perfume, which is dispersed in water, is mixed prior to the freezing.

7. The porous body of claim 1, wherein the freeze-dried product is of (a).

8. The porous body of claim 1, wherein the freeze-dried product is of (b).

9. The porous body of claim 1, wherein the polysaccharide is gelatinized starch.

10. The porous body of claim 1, wherein the polysaccharide is sodium alginate powder.

11. The porous body of claim 1, wherein the polysaccharide is carboxymethyl cellulose powder.

* * * * *